(12) United States Patent
Bäckman et al.

(10) Patent No.: US 8,722,807 B2
(45) Date of Patent: May 13, 2014

(54) POLYMER COMPOSITION FOR INJECTION MOULDING

(75) Inventors: Mats Bäckman, Göteborg (SE); James McGoldrick, Marchtrenk (AT); Bo Hovgard, Stenungsund (SE); Siegfried Liedauer, Wihering (AT); David Walton, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 545 days.

(21) Appl. No.: 11/666,626

(22) PCT Filed: Nov. 2, 2005

(86) PCT No.: PCT/EP2005/011723
§ 371 (c)(1),
(2), (4) Date: Sep. 24, 2007

(87) PCT Pub. No.: WO2006/048259
PCT Pub. Date: May 11, 2006

(65) Prior Publication Data
US 2009/0062463 A1 Mar. 5, 2009

(30) Foreign Application Priority Data

Nov. 3, 2004 (EP) .................................. 04026096

(51) Int. Cl.
*C08L 23/08* (2006.01)
*C08L 23/04* (2006.01)

(52) U.S. Cl.
CPC ............. *C08L 23/08* (2013.01); *C08L 2205/03* (2013.01); *C08L 23/0815* (2013.01); *C08L 2205/025* (2013.01)
USPC ............. 525/240; 525/52; 525/324; 526/352; 526/352.2

(58) Field of Classification Search
CPC .......... C08L 23/0815; C08L 2205/025; C08L 2205/03
USPC .................. 525/240, 52, 324; 526/352, 352.2
See application file for complete search history.

(56) References Cited

U.S. PATENT DOCUMENTS

| | | | |
|---|---|---|---|
| 6,185,349 B1 * | 2/2001 | Dammert et al. | 385/100 |
| 6,191,227 B1 * | 2/2001 | Matsuoka et al. | 525/240 |
| 6,455,642 B1 * | 9/2002 | Myhre et al. | 526/64 |
| 6,632,884 B1 | 10/2003 | Skar et al. | |
| 2002/0045711 A1 * | 4/2002 | Backman et al. | 525/240 |
| 2003/0113496 A1 * | 6/2003 | Harris et al. | 428/36.9 |
| 2003/0139530 A1 * | 7/2003 | Starita | 525/240 |
| 2003/0144390 A1 * | 7/2003 | Dammert et al. | 524/88 |

FOREIGN PATENT DOCUMENTS

| | | | |
|---|---|---|---|
| EP | 1359191 A1 * | 11/2003 | C08L 23/04 |
| EP | 1460105 A1 | 9/2004 | |
| EP | 1489112 A2 * | 12/2004 | C08F 210/02 |
| EP | 1 146 079 | 1/2006 | |
| WO | WO 03/087199 * | 11/2003 | C08J 3/28 |

OTHER PUBLICATIONS

Viscosity Determination at 747 Pa Shear Stress filed in the European Opposition of EP 1,655,355 (2007).*
Equistar Technical Topic "Mold Shrinkage" (no date).*
International Search Report for International Application No. PCT/EP2005/011723.

* cited by examiner

*Primary Examiner* — Mark Kaucher
(74) *Attorney, Agent, or Firm* — Fay Sharpe LLP

(57) ABSTRACT

The application relates to a polyethylene composition having a base resin, the base resin comprising (A) a first polyethylene fraction, and (B) a second polyethylene fraction, wherein the melt flow rate $MFR_{5/190°\,c.}$ of the first fraction is higher than the melt flow rate $MFR_{5/190°\,c.}$ of the second fraction, the flow rate ratio $FRR_{21/5}$ of the polyethylene composition, defined as the ratio of melt flow rate $MFR_{21-6/190°\,c.}$ to melt flow rate $MFR_{5/190°\,c.}$, is within the range of 15-28, and 10 the melt flow rate $MFR_{5/190°\,c.}$ of the polyethylene composition is within the range of 0.5-1.1 g/10 min.

8 Claims, No Drawings

POLYMER COMPOSITION FOR INJECTION MOULDING

The present invention relates to a polymer composition useful for injection moulding, a process for the production of the composition, to injection moulded articles comprising the composition, in particular fittings prepared therefrom, and to the use of the composition in injection moulding.

Pipes of polymeric materials are frequently used for various purposes such as fluid transport, i.e. transport of liquids or gas, e.g. water or natural gas, during which the fluid can be pressurized. Moreover, the transported fluid may have varying temperatures, usually within the temperature range from about 0° C. to about 50° C. Such pressure pipes are preferably made of polyolefin plastic, traditionally unimodal ethylene plastic such as medium density polyethylene (MDPE: density: 0.930-0.942 g/cm$^3$) and high density polyethylene (HDPE: density: 0.942-0.965 g/cm$^3$). By the expression "pressure pipe" herein is meant a pipe which, when used, is subjected to a positive pressure, i.e. the pressure inside the pipe is higher than the pressure outside the pipe.

For pipes subjected to an internal fluid pressure, specific properties are relevant and have to be optimised. Relevant properties are e.g. impact strength, modulus of elasticity, rapid crack propagation resistance or slow crack growth resistance. Furthermore, just like for pipes in general, the polymers from which they are prepared should have good processability.

Polymer pipes are generally manufactured by extrusion or, to a much smaller extent, by injection moulding. A conventional plant for extrusion of polymer pipes comprises an extruder, a die-head, a calibrating device, cooling equipment, a pulling device and device for cutting or for coiling-up the pipe. Since extrusion is the commonly preferred manufacturing method, properties of pipe materials are optimised for this method.

For many applications, it is necessary to connect different pipes by fittings specifically adapted to the diameter of each pipe. In contrast to pipes, these fittings may have a complex three-dimensional structure, e.g. a T-shaped, cross-shaped or bent structure. However, fittings can also be prepared in the form of pipes of constant or varying diameter. For preparing polymeric articles having a complex three-dimensional structure, injection moulding is preferred to extrusion since it is a cost-effective means for producing these articles at high production rate. However, injection moulding requires rheological properties specifically adapted to this method, whereas the final articles should still have excellent mechanical properties, i.e. mechanical properties still meeting the official quality standards established for pipes. This is particularly true for pipe fittings, since the same long-term internal pressure does not only put a strain on the pipe, but also on the fittings connecting these pipes. Thus, quite often a polymer suitable for extrusion cannot be used for injection moulding, either due to its inappropriate rheological properties or due to insufficient mechanical properties of the resultant product.

Injection moulding is a repetitive process in which a polymeric material is melted and injected into a mould cavity where the article is cooled down. In the injection moulding process, filling of the mould and solidification partially take place at the same time. However, instant cooling generates internal stress, thereby increasing the risk of stress cracking. Thus, the polymeric melt must have sufficient flowability to fill the complete cavity before solidification takes place. Furthermore, if rheological properties are not carefully fine-tuned, the resultant moulded articles will have surface defects, e.g. stripes or wave patterns. Desired surface properties are shininess as well as a surface free from flow marks.

The step of filling the mould cavity is normally followed by a packing step, wherein a packing pressure is applied to ensure complete filling. After solidification, the mould opens and the article is ejected. However, another problem typically arising from injection moulding processes is shrinkage of the resultant article. Especially for fittings which are specifically adapted to the size of other articles like pipes, very low shrinkage is of crucial importance.

Shrinkage is a complex phenomenon which is not only dependent from compressibility and thermal expansion of the polymeric material but also from other properties like the degree of crystallinity or crystallization speed. Molecular weight and molecular weight distribution are also important properties for shrinkage. Furthermore, shrinkage values of a polymer can vary in different directions due to preferred orientations of polymer molecules. Thus, shrinkage values are actually affected by a number of parameters which all have to be carefully fine-tuned to reduce shrinkage. However, any fine-tuning of relevant shrinkage parameters inevitably affects mechanical properties of the resultant injection moulded product. Thus, it is highly appreciated to simultaneously optimise injection moulding behaviour including shrinkage properties as well as mechanical properties of the final product.

As indicated above, pipes are normally made by extrusion which is why rheological properties of polymeric pipe materials have to be consistent with such a process. If the polymeric material is carefully chosen, mechanical properties of pipes resulting from these extrusion processes are improved. However, due to different demands on both methods, polymers suitable for extrusion are simply not suitable for injection moulding.

WO 00/01765 discloses a multimodal polyethylene composition for pipes. The polyethylene composition has a ratio of $M_w/M_n$ within the range of 20-35, indicating a rather broad molecular weight distribution.

WO 00/22040 also discloses a multimodal polyethylene composition for pipes. The shear thinning index $SHI_{2.7/210}$ is specifically restricted to a range of 50-150.

Considering the problems mentioned-above, it is one object of the present invention to provide a polymeric composition which is suitable for injection moulding and still results in a final product having excellent mechanical properties, i.e. mechanical properties still meeting the official quality standards for pipes. In particular, it is an object to provide a polymer composition for preparing fittings by injection moulding, these fittings having mechanical properties at least comparable to those of the corresponding pipes and having low post-moulding shrinkage.

According to a first aspect of the present invention, these objects are solved by providing a polyethylene composition comprising a base resin, the base resin comprising (A) a first polyethylene fraction, and
(B) a second polyethylene fraction, wherein the melt flow rate $MFR_{5/190° C.}$ of the first fraction is higher than the melt flow rate $MFR_{5/190° C.}$ of the second fraction, the flow rate ratio $FRR_{21/5}$ of the polyethylene composition, defined as the ratio of melt flow rate $MFR_{21.6/190° C.}$ to melt flow rate $MFR_{5/190° C.}$, is within the range of 15-28, and the melt flow rate $MFR_{5/190° C.}$ of the polyethylene composition is within the range of 0.5-1.1 g/10 min.

According to a second aspect of the present invention solving the above-mentioned problems, a polyethylene composition is provided which comprises a base resin, the base resin comprising (A) a first polyethylene fraction, and (B) a second polyethylene fraction, wherein the melt flow rate $MFR_{5/190°\,C.}$ of the first fraction is higher than the melt flow rate $MFR_{5/190°\,C.}$ of the second fraction, the polyethylene composition having a spiral flow length of 55 cm or less and a transverse middle shrinkage of 1.1% or less.

The polyethylene compositions according to the present invention can be prepared by slurry polymerization of the first polymer fraction in a loop reactor, followed by gas phase polymerization of the second polyethylene fraction, and are particular useful for injection moulding and articles prepared therefrom.

According to both aspects of the present invention, the polyethylene composition needs to comprise a base resin having at least two fractions which differ in their melt flow rate $MFR_{5/190°\,C.}$. Melt flow rate $MFR_{5/190°\,C.}$ is determined according to ISO 1133, condition T. The higher the melt flow rate, the lower the viscosity of the polymeric material. Furthermore, melt flow rate and average molecular weight are inversely related to each other, i.e. higher melt flow rate is equivalent to lower average molecular weight, and vice versa.

With regard to the first and second polymer fraction of the present invention, this means that the average molecular weight of the first fraction is lower than the average molecular weight of the second fraction.

The term "base resin" means the entirety of polymeric components in the polyethylene composition according to the invention, usually making up at least 90 wt % of the total composition. Preferably, the base resin is consisting of fractions (A) and (B), optionally further comprising a prepolymer fraction in an amount of up to 20 wt %, more preferably up to 10 wt % and most preferably up to 5 wt % of the total base resin.

Usually, a polyethylene composition comprising at least two polyethylene fractions such as the composition according to the invention, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The expressions "first fraction" and "second fraction" do not refer to the chronological order of preparation but simply indicate that there are at least two different fractions. Thus, in principle both fractions could be prepared simultaneously or the fraction having a high molecular weight (i.e. second fraction) could be prepared first.

Furthermore, the polymerisation of each fraction can be completed in different reactors, followed by mixing the resulting fractions, or as an alternative a first fraction is at least partially polymerised in a first reactor and then transferred to a second reactor where polymerisation of the second fraction is carried out in the presence of the first fraction. However, as will be discussed below, it is preferred to prepare the fraction of lower average molecular weight in a first reactor, then transferring the first fraction to a second reactor wherein polymerisation of the second fraction having higher average molecular weight is carried out.

According to the first aspect of the present invention, it is an essential feature that the polyethylene composition has a flow rate ratio $FRR_{21/5}$, defined as the ratio of melt flow rate $MFR_{21.6/190°\,C.}$ to melt flow rate $MFR_{5/190°\,C.}$, within the range of 15-28. $FRR_{21/5}$ is related to MWD, i.e. decreasing values for FRR indicate a decreasing width of the molecular weight distribution, and vice versa.

To establish $FRR_{21/5}$ values, the corresponding melt flow rates $MFR_{5/190°\,C.}$ and $MFR_{21.6/190°\,C.}$ of the polyethylene composition have to be measured. Melt flow rate is determined according to ISO 1133 and is related to flowability and, consequently, to processability of the polymer. The higher the melt flow rate, the lower the viscosity of the polymer. In the present invention, $MFR_{5/190°\,C.}$ is determined according to ISO 1133, condition T, and $MFR_{21.6/190°\,C.}$ is determined according to ISO 1133, condition G.

The melt flow rate $MFR_{5/190°\,C.}$ of the polyethylene composition according to the first aspect of the present invention is within the range of 0.5-1.1 g/10 min. If the melt flow rate does not exceed a specific lower limit, the polymeric melt does not have sufficient flowability and, consequently, cannot flow into the whole cavity volume within a short period of time. However, if $MFR_{5/190°\,C.}$ exceeds a specific upper limit, the mechanical properties of the resulting product are adversely affected.

According to a second aspect of the present invention, the polyethylene composition comprising two fractions of different melt flow rate has a spiral flow length of 55 cm or less and a transverse-middle shrinkage of 1.1% or less.

Spiral flow length is a possible criterion for evaluating flowability of a polymeric composition in a mould and, consequently, is a useful parameter for evaluating injection moulding properties. Spiral flow length is established by measuring how far the melted composition is forced in a spiral cavity by applying a specific pressure and temperature. For measuring spiral flow length in the present invention, the spiral cavity is held at a temperature of 50° C. After injection, the polymeric melt cools down and solidifies on its way through the spiral. Finally, the material reaches a temperature of 50° C., i.e. the temperature of the spiral cavity. Injection of the polymeric composition into the spiral cavity is effected at a pressure of 1400 bar. Further details are provided in the experimental section.

Transverse middle shrinkage is measured at a temperature of 23° C. Further details are provided in the experimental section.

Injection moulding properties and mechanical properties can be simultaneously improved if spiral flow length as well as shrinkage do not exceed the limits given above.

Preferably, transverse middle shrinkage is below 1.0%, usually in the range of within the range of 0.5-1.0%, even more preferably below 0.9%, usually between 0.5 and 0.9%.

In a preferred embodiment, spiral flow length is 52.5 cm or less, even more preferred 46 cm or less.

Furthermore, preferably spiral flow length is 42 cm or more, even more preferred 44.5 cm or more.

For polyethylene compositions according to the second aspect of the present invention, the flow rate ratio $FRR_{21/5}$ preferably is within the range of 15-28.

Further, the melt flow rate $MFR_{5/190°C}$ preferably is within the range of 0.5-1.1 g/10 min.

In the following, preferred embodiments applying to both the first and second aspect of the present invention are described.

It is preferred that polyethylene compositions according to the present invention have a flow rate ratio $FRR_{21/5}$ within the range of 20-28, more preferably within the range of 20-26.

The melt flow rate $MFR_{5/190°C}$ of the polyethylene compositions is preferably within the range of 0.6-1.0 g/10 min, more preferably 0.65-0.85 g/10 min, and even more preferably, it is 0.7-0.8 g/10 min.

According to a preferred embodiment of the present invention, the shear thinning index $SHI_{2.7/210}$ of the polyethylene compositions is within the range of 10-60. More preferably, SHI is within the range of 15-50, even more preferred 15-40.

The effect of shear thinning is related to molecular weight distribution (MWD), i.e. shear thinning gets more pronounced, the broader the molecular weight distribution is. This property can be approximated by defining a so-called shear thinning index SHI as a ratio of viscosities measured at two different shear stresses. In the present invention, shear stresses of 2.7 kPa and 210 kPa are used for calculating $SHI_{2.7/210}$ as a measure of the broadness of the molecular weight distribution:

$$SHI_{2.7/210} = \eta^*_{2.7}/\eta^*_{210}$$

wherein $\eta^*_{2.7}$ is the complex viscosity at $G^* = 2.7$ kPa and
$\eta_{210}$ is the complex viscosity at $G^* = 210$ kPa.

Values of $\eta^*_{2.7}$ and $\eta^*_{210}$ were established as disclosed in WO 00/22040. Rheological measurements were made using the rheometer Rheometrics Physica MCR 300. The measurements were performed at 190° C. under nitrogen atmosphere using plate & plate test fixture with a diameter of 25 mm. The strain amplitude was so chosen that a linear working range was obtained. From the measurements, storage modulus (G') and loss modulus (G") together with absolute values of complex viscosity ($\eta^*$) as a function of frequency $\omega$ or the absolute values of complex modulus (G*) were obtained.

According to a preferred embodiment, the polyethylene composition has a viscosity $\eta$ at a shear stress of 747 Pa of 300 kPa*s or less, more preferably 250 kPa*s or less, and even more preferred 200 kPa*s or less. The viscosity is measured at a temperature of 190° C.

The first polyethylene fraction having a lower average molecular weight can be either a homopolymer or a copolymer. However, preferably it is an ethylene homopolymer fraction.

According to a preferred embodiment, the second polyethylene fraction of higher molecular weight is a copolymer of ethylene and at least one comonomer. As comonomers, α-olefins with 4-8 carbon atoms can be used. However, it is preferred to have comonomers selected from the group consisting of 1-butene, 1-hexene, 4-methyl-1-pentene and 1-octene. 1-hexene and 1-octene are especially preferred.

To have appropriate mechanical properties like improved rapid crack propagation resistance and impact strength, the amount of comonomer should be 0.4-3.5 mole-%, preferably 0.4-2.5 mole-%. In a preferred embodiment, 1-hexene is used as a comonomer in an amount of 0.4-0.9 mole-% of the polyethylene composition.

The weight ratio of both fractions can be adjusted by selecting appropriate reaction conditions in each reactor. Preferably, the weight ratio of the fraction having a lower average molecular weight (first fraction) to the fraction of higher average molecular weight (second fraction) is (35-65):(65-35), more preferably (40-60):(60-40), and even more preferably (42-58):(58-42). The most preferred weight ratio of the first fraction to the second fraction is (44-56):(56-44).

Furthermore, the lower limit of any molecular weight measured for polymers of the second fraction (B) is preferably 3500, more preferably 4000.

For the base resin, the density is preferably within the range of 0.940 to 0.960 g/cm³, even more preferably 0.945 to 0.952 g/cm³.

In addition to the base resin, common additives can be included in the polyethylene composition, such as pigments (e.g. carbon black), stabilizers (e.g. antioxidants), antistatic agents, anti-UV agents and processing aid agents. Preferably, these components are added in an amount of 8 wt.-% or less, more preferably in an amount of 6 wt.-% or less, based on the total weight of the final polyethylene composition.

Preferably, the polyethylene composition comprises carbon black in an amount of 6 wt.-% or less, more preferably 4 wt.-% or less. In a preferred embodiment, the amount of carbon black is within the range of 2.0-2.5 wt.-%, based on the total weight of the final polyethylene composition.

Additives different from carbon black are preferably present in an amount of 1 wt.-% or less, more preferably 0.5 wt.-% or less.

For the final polyethylene composition, the density is preferably within the range of 0.930-0.965 g/cm³, even more preferably 0.950-0.962 g/cm³.

Where herein preferred features of fractions (A) and/or (B) of the composition of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

The polyethylene composition according the invention preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Further, the polyethylene base resin preferably is produced in a multistage process. Polymer compositions produced in such a process are also designated as "in-situ"-blends.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20% by weight, preferably 1 to 10% by weight, more preferably 1 to 5% by weight, of the total base resin is produced. The prepolymer is preferably an ethylene homopolymer (HDPE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

As polymerisation catalysts may be used coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably, Ziegler-Natta and metallocene catalysts may be used. More preferably, the catalyst is a ZN catalyst, still more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794, FI 980 788 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture.

It is preferred that the multimodal base resin of the polyethylene composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

Preferably, the base resin of the polyethylene composition is produced with a rate of at least 5 tons/h, more preferably at least 10 ton/h, and most preferably at least 15 tons/h.

The composition of the invention preferably is produced in a process comprising compounding step, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The extruder may be e.g. any conventionally used extruder. As an example of an extruder for the present compounding step may be those as supplied by Japan steel works, Kobe steel or Farrel-Pomini, e.g. JSW 460P.

In one embodiment, the extrusion step is carried out using production rates of at least 400, at least 500, at least 1000 kg/h may be used in said compounding step.

In another embodiment the compounding step can be effected with production rate of that least 5 tons/h, preferably at least 15 tons/h, more preferably at least 20 or 25 tons/h or even at least 30 or more tons/h, such as at least 50, such 1-50, preferably 5-40, 10-50, in some embodiments 10-25 tons/h.

Alternatively, production rates at least 20 tons/h, preferably at least 25 tons/h, even at least 30 tons/h, e.g. 25-40 tons/h may be desired during the compounding step.

The present multimodal polyethylene composition of the invention enables such production rates within the property window of the invention, i.e. with various property combinations of MFR's of the fractions and of final base resin variations together with excellent homogeneity, just to mention few.

Preferably, in said extrusion step, a total SEI (specific energy input) of the extruder may be at least 150, 150-400, 200-350, 200-300 kWh/ton.

It is known that the temperature of the polymer melt may vary in the extruder, the highest (max) melt temperature of the composition in the extruder during the extrusion step is typically more than 150° C., suitably between 200 to 350° C., preferably 250 to 310° C., more pref. 250 to 300° C.

Furthermore, the present invention relates to a process for the production of a polyethylene composition as described hereinbefore comprising the steps of
i) polymerising ethylene monomers, and optionally one or more alpha-olefin comonomers, in the presence of a Ziegler-Natta catalyst to obtain a first ethylene homo- or copolymer fraction (A)
ii) polymerising ethylene monomers, and optionally one or more alpha-olefin comonomers, in the presence of a Ziegler-Natta catalyst to obtain a second ethylene homo- or copolymer fraction (B) having a higher average molecular weight than fraction (A)
wherein the second polymerisation step is carried out in the presence of the polymerization product of the first step.

Preferably, the polymerization to obtain fraction (A) is carried out in a loop reactor.

Furthermore, the polymerization to obtain fraction (B) is preferably carried out in a gas phase reactor.

The first polymerisation step preferably is preceded by a prepolymerisation step in which preferably at most 20 wt %, more preferably at most 10 wt % and still more preferably at most 5 wt % of the total base resin is produced.

Usually, the first polymer of high melt flow rate, fraction (A), (lower average molecular weight, LMW) and with no addition of comonomer is produced in the first reactor, whereas a second polymer of low melt flow rate (higher average molecular weight, HMW) and with addition of comonomer is produced in the second reactor.

As comonomer of the HMW fraction (B) various alpha-olefins with 4-8 carbon atoms may be used, but the comonomer is preferably selected from the group consisting of 1-butene, 1-hexene, 4-methyl-1-pentene, and 1-octene.

The amount of comonomer is preferably 0.4-3.5 mole-%, more preferably 0.4-2.5 mole-% and most preferably 0.4-0.9 mole-% of the multimodal polyethylene.

The melted multimodal polyethylene composition shows improved flowability, thereby easily filling mould cavities. After solidification of the injected melt, only low shrinkage is observed. Thus, the polymer composition of the present invention is particularly useful for injection moulding processes.

Furthermore, articles resulting from the injection moulding process still show mechanical properties which are identical to or at least quite close to those of pipes prepared by extrusion, in particular "pressure pipes" subjected to a positive pressure when used. Consequently, fittings like pipe fittings can be made from polyethylene compositions of the present invention.

Relevant mechanical properties of articles resulting from injection moulding processes are e.g. rapid crack propagation resistance, impact strength, stress crack resistance or creep rupture strength.

The rapid crack propagation (RCP) resistance of a fitting having the form of a pipe and being prepared by injection moulding can be determined according to a method called the S4 test (Small Scale Steady State), which has been developed at Imperial College, London, and which is described in ISO 13477.

According to the RCP-S4 test, a pipe is tested, which has an axial length not below 7 pipe diameters. The outer diameter of the pipe is about 110 mm or greater and its wall thickness about 10 mm or greater. When determining the RCP properties of a pipe-like fitting according to the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure.

The pipe and the surrounding equipment are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$), i.e. the ductile brittle transition temperature as measured according to ISO 13477 is the lowest temperature at which the pipe passes the test. The lower the critical temperature the better, since it results in an extension of the applicability of the pipe. A pipe-like fitting made of the multimodal polymer composition according to the present invention preferably has an RCP-S4 value of −1° C. (minimum requirement for an MD PE80 pipe) or lower, more preferably −4° C. (minimum requirement for an HD PE80 pipe) or lower.

The impact strength is determined as Charpy Impact Strength according to ISO 179 1EA. Multimodal polymer compositions according to the present invention to be used for the preparation of pipe fittings preferably have an impact strength at 0° C. of at least 8 kJ/m$^2$, more preferably at least 9 kJ/m$^2$.

Stress crack resistance is established in a pipe notch test which is standardized in ISO 13479. The test simulates slow crack growth and records time to failure on notched pipes. Tests were made at 80° C. and a pressure of 4.6 MPa.

Slow crack growth measurements PENT at pressure of 2.8 MPa were made according to ASTM F 1473.

Creep rupture strength is established in an internal pressure test which is standardized in ISO 1167 and EN 921.

The evaluation of surface properties is made manually by the naked eye. The desired surface is a shiny mirror-like surface. Any disturbances of the surface, e.g. flow patterns, surface roughness, gels or other distortions are classified and noted.

The present invention will now be illustrated in further detail by making reference to examples of preferred embodiments.

Experimental a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: 9.54*10$^{-5}$ and a: 0.725 for PS, and K: 3.92*10$^{-4}$ and a: 0.725 for PE). The ratio of $M_w$ and $M_n$ is a measure of the broadness of the distribution, since each is influenced by the opposite end of the "population".

b) Spiral Flow Length

Spiral flow length F is measured using an injection automat with plasticating screw: ENGEL ES 250.
screw diameter: 55 mm
max. piston displacement: 620 cm$^3$
spec. injection pressure: 1400 bar
tool form: spiral form; cross section: trapezium, thickness 2.1 mm cross sectional area 20.16 mm$^2$
temperature in pre-chamber and die: 260° C.
temperature in zone 2/zone 3/zone 4/zone 5: 260° C./240° C./220° C./200° C.
injection cycle: pre-injection time: 5 s
  post-injection time: 3 s
  cooling time: 10 s
dwell pressure=injection pressure
screw speed: 100 rpm
backpressure: 0 bar
metering path: should be chosen so that the screw stops 20 mm before its final position at the end of the dwell pressure.
tool temperature: 50° C.

The spiral flow length can be determined immediately after the injection operation. From the measured values (at least 10 spirals), an average value is calculated.

c) Shrinkage

Shrinkage is measured using the apparatus DIGIMATIC INDICATOR from MITUTOYO Corporation. For calibration, a standard plate made of steel and having a size of 150 mm×80 mm is used. The measurement is performed at 23° C., at the earliest 96 h after injection. For measurement of transverse shrinkage, the standard plate is put into the apparatus in transversal direction and the zero position is fixed. Subsequently, the test plate having a size of 150 mm×80 mm is put into the apparatus. For measurement of transverse middle shrinkage, the test plate is put into the apparatus such that the side remote from the gate mark is positioned at the middle stop.

The plate for shrinkage measurements was prepared by injection moulding using the following parameters:

| | |
|---|---|
| melt temperature: | 240° C. |
| mould temperature: | 50° C. |
| flow front velocity: | 100 mm/sec |
| back pressure (specific): | 990 decreased to 300 bar |
| back pressure time: | 10 sec |
| cooling time: | 20 sec |

The machine used for injection moulding was an ENGEL ES 250.

All other physical properties were measured as indicated above.

EXAMPLES

Example 1

A multimodal polyethylene composition according to the present invention was prepared in a two-step process, the first reaction step being carried out in a loop reactor, followed by further polymerization in a gas-phase reactor. Prior to the loop reactor step, a prepolymerization was performed. 1-Hexene was used as the comonomer in the HMW fraction produced in the gas-phase reactor. The comonomer content in the resultant polymer was 2.2 wt.-%. As a catalyst, Lynx 200™ (a magnesium dichloride based titanium chloride catalyst, manufactured and marketed by Engelhard Corporation, Pasadena, U.S.A.) was used. Reaction conditions are summarized in Table 1.

Density, $MFR_{5/190° C.}$, $MFR_{21.6/190° C.}$, $FRR_{21/5}$, shear thinning index SHI, viscosity eta at shear stress of 747 Pa, and spiral flow length of the resultant composition were established. The results are given in Table 2.

The polymer composition was then extruded to a pipe and rapid crack propagation resistance according to the S4 test, stress crack resistance, creep rupture strength and slow crack growth measurements PENT were performed.

Charpy impact strength and shrinkage were established on injection moulded plates in accordance with the experimental conditions mentioned above and the results are shown in Table 2.

Example 2

A multimodal polyethylene composition according to the present invention was prepared in a two-step process, the first reaction step being carried out in a loop reactor, followed by further polymerization in a gas-phase reactor. Prior to the loop reactor step, a prepolymerization was performed. 1-Hexene was used as the comonomer in the HMW fraction produced in the gas-phase reactor. The comonomer content in the resultant polymer was 2.7 wt.-%. The same catalyst was used as in Example 1. Reaction conditions are summarized in Table 1.

Density, $MFR_{5/190° C.}$, $MFR_{21.6/190° C.}$, $FRR_{21/5}$, shear thinning index SHI, viscosity eta at shear stress of 747 Pa, and spiral flow length of the resultant composition were established. The results are given in Table 2.

The polymer composition was then extruded to a pipe and rapid crack propagation resistance according to the S4 test, stress crack resistance, creep rupture strength and slow crack growth measurements PENT were performed.

Charpy impact strength and shrinkage were established on injection moulded plates in accordance with the experimental conditions mentioned above and the results are shown in Table 2.

Comparative Example 1

A multimodal polyethylene composition was prepared in a two-step process, the first reaction step being carried out in a loop reactor, followed by further polymerisation in a gas phase reactor. Prior to the loop reactor step, a prepolymerization was performed. 1-Butene was used as the comonomer in the HMW fraction produced in the gas-phase reactor. The comonomer content in the resultant polymer was 1.05 wt %. A Ziegler-Natta type catalyst as described in EP 688 794 was used. Reaction conditions are summarized in Table 1. Density, $MFR_{5/190°\ C.}$, $MFR_{21.6/190°\ C.}$, $FRR_{21/5}$, shear thinning index SHI, viscosity eta at shear stress of 747 Pa, and spiral flow length of the resultant composition were established. The results are given in Table 2.

The polymer composition was then extruded to a pipe and rapid crack propagation resistance according to the S4 test, stress crack resistance, creep rupture strength and slow crack growth measurements PENT were performed.

Charpy impact strength and shrinkage were established on injection moulded plates in accordance with the experimental conditions mentioned above and the results are shown in Table 2.

Comparative Example 2

A multimodal polyethylene composition was prepared in a two-step process, the first reaction step being carried out in a loop reactor, followed by further polymerisation in a gas phase reactor. Prior to the loop reactor step, a prepolymerization was performed. 1-Hexene was used as the comonomer in the HMW fraction produced in the gas-phase reactor. The comonomer content in the resultant polymer was 2.1 wt %. A Ziegler-Natta type catalyst as described in EP 688 794 was used. Reaction conditions are summarized in Table 1. Density, $MFR_{5/190°\ C.}$, $MFR_{21.6/190°\ C.}$, $FRR_{21/5}$, shear thinning index SHI, viscosity eta at shear stress of 747 Pa, and spiral flow length, of the resultant composition were established. The results are given in Table 2.

The polymer composition was then extruded to a pipe and rapid crack propagation resistance according to the S4 test, stress crack resistance, creep rupture strength and slow crack growth measurements PENT were performed.

Charpy impact strength and shrinkage were established on injection moulded plates in accordance with the experimental conditions mentioned above and the results are shown in Table 2.

TABLE 1

|  | Example 1 | Example 2 | Comparative Example 1 | Comparative Example 2 |
|---|---|---|---|---|
| comonomer prepolymerization | 1-hexene | 1-hexene | 1-butene | 1-hexene |
| temperature (° C.) | 40 | 40 | 40 | 70 |
| $MFR_{2.1/190°\ C.}$ (dg/min) | 10 | 10 | 10 | 10 |
| Loop Reactor |  |  |  |  |
| temperature (C. °) | 95 | 95 | 95 | 95 |
| pressure (bar) | 57 | 57 | 56 | 57.8 |
| $H_2/C_2$ ratio (mole/kmole) | 855 | 875 | 503 | 391 |
| $MFR_{2.1/190°\ C.}$ (dg/min) | 370 | 500 | 450 | 320 |
| Gas phase reactor |  |  |  |  |
| temperature (° C.) | 90 | 90 | 85 | 85 |
| pressure (bar) | 20 | 20 | 20 | 20 |
| $H_2/C_2$ ratio (mole/kmole) | 50.0 | 53.8 | 25.7 | 13.2 |
| $C_{6/4}/C_2$ ratio (mole/kmole) | 46 | 67 | 95 |  |
| $MFR_5$ (dg/min) | 0.57 | 0.93 | 0.28 | 0.30 |
| density base resin (kg/cm³) | 949 | 947 | 948 | 949 |
| split | 2/45/53 | 2/46/52 | 2/48/50 | 1/43/56 |

TABLE 2

|  | Example 1 | Example 2 | Comparative Example 1 | Comparative Example 2 |
|---|---|---|---|---|
| $MFR_{5/190°\ C.}$ (g/10 min) | 0.55 | 0.98 | 0.27 | 0.26 |
| $MFR_{21.5/190°\ C.}$ (g/10 min) | 13 | 24 | 10.7 | 7 |
| $FRR_{21/5}$ | 24 | 24 | 39.7 | 28.5 |
| density base resin (kg/cm³) | 949 | 947 | 949 | 949 |
| density final composition (kg/cm³) | 958.7 | 959.6 | 957.5 | 954.8 |
| $SHI_{2.7/210}$ | 32 | 30 | 77.2 | 49 |
| $\eta_{747\ Pa}$ (kPa*s) | 163 | 87 | 510 | 466 |
| spiral flow length (cm) | 45.5 | 52.5 | 44.0 | 41.5 |
| Charpy impact strength at 0° C. (kJ/m²) | 13.9 | 11.1 | 14.2 | 15.4 |
| S4-test (° C.) | −9 | −2 | −12 | −11 |
| pipe notch test at 4.6 MPa (h) | 910 | 2174 | >1500 | >1500 |
| PENT at 2.8 MPa (h) | 966 | 1081 | >1500 |  |
| internal pressure test |  |  |  |  |
| 5.7 MPa (h) | 2869(cont) | 39 | >500 | >500 |
| 5.5 MPa (h) | 5112(cont) | 491 | >5000 | >4000 |
| 5.2 MPa (h) | 5112(cont) | 5112(cont) |  |  |
| transverse middle shrinkage (%) | 0.81 | 0.87 | 1.7 | 1.8 |
| surface judgement | good | good | poor | poor |

(cont): These measurements have not yet finished but are still going on, i.e. the final values will be even higher.

The invention claimed is:

1. A multimodal polyethylene composition having a base resin, the base resin comprising
   (A) a first polyethylene fraction which is an ethylene homopolymer, and
   (B) a second polyethylene fraction,
   wherein the melt flow rate $MFR_{5/190°\ C.}$ of the first fraction is higher than the melt flow rate $MFR_{5/190°\ C.}$ of the second fraction; the flow rate ratio $FRR_{21/5}$ of the polyethylene composition, defined as the ratio of melt flow rate $MFR_{21.6/190°\ C.}$ to melt flow rate $MFR_{5/190°\ C.}$, is within the range of 20-24; and the melt flow rate $MFR_{5/190°\ C.}$ of the polyethylene composition is within the range of 0.5-1.1 g/10 min;
   wherein the composition has a shear thinning index (SHI), defined as the ratio of viscosity at a shear stress of 2.7 kPa to viscosity at a shear stress of 210 kPa, within the range of 15-40; and
   wherein the base resin has a density of from 0.945 to 0.952 g/cm³.

2. The polyethylene composition according to claim 1, wherein the flow rate ratio $FRR_{21/5}$ of the polyethylene composition is 20.

3. The polyethylene composition according to claim 1, wherein the flow rate ratio $FRR_{21/5}$ of the polyethylene composition is 24.

4. The polyethylene composition according to claim 1, wherein the shear thinning index (SHI) of the composition is within the range of 15 to 32.

5. The polyethylene composition according to claim 1, wherein the density of the base resin is within the range of 0.947 to 0.952 g/cm³.

6. The polyethylene composition according to claim 1, wherein the density of the base resin is within the range of 0.949 to 0.952 g/cm$^3$.

7. A multimodal polyethylene composition having a base resin, the base resin comprising
- (A) a first polyethylene fraction which is an ethylene homopolymer,
- (B) a second ethylene fraction, and
- (C) a prepolymer fraction,
- wherein the melt flow rate MFR$_{5/190°\,C.}$ of the first fraction is higher than the melt flow rate MFR$_{5/190°\,C.}$ of the second fraction; the flow rate ratio FRR$_{21/5}$ of the polyethylene composition, defined as the ratio of melt flow rate MFR$_{21.6/190°\,C.}$ to melt flow rate MFR$_{5/190°\,C.}$, is within the range of 20-24; and the melt flow rate MFR$_{5/190°\,C.}$ of the polyethylene composition is within the range of 0.5-1.1 g/10 min;
- wherein the composition has a shear thinning index (SHI), defined as the ratio of viscosity at a shear stress of 2.7 kPa to viscosity at a shear stress of 210 kPa, within the range of 15-40;
- wherein the base resin has a density of from 0.945 to 0.952 g/cm$^3$;
- wherein the prepolymer fraction is an ethylene homopolymer present in amount of from greater than 0 wt % to 20 wt % of the base resin.

8. A multimodal polyethylene composition having a base resin, the base resin comprising
- (A) a first polyethylene fraction which is an ethylene homopolymer,
- (B) a second polyethylene fraction, and
- (C) a prepolymer fraction,
- wherein the melt flow rate MFR$_{5/190°\,C.}$ of the first fraction is higher than the melt flow rate MFR$_{5/190°\,C.}$ of the second fraction; the flow rate ratio FRR$_{21/5}$ of the polyethylene composition, defined as the ratio of melt flow rate MFR$_{21.6/190°\,C.}$ to melt flow rate MFR$_{5/190°\,C.}$, is within the range of 20-24; and the melt flow rate MFR$_{5/190°\,C.}$ of the polyethylene composition is within the range of 0.5-1.1 g/10 min;
- wherein the composition has a shear thinning index (SHI), defined as the ratio of viscosity at a shear stress of 2.7 kPa to viscosity at a shear stress of 210 kPa, within the range of 15-32;
- wherein the base resin has a density of from 0.949 to 0.952 g/cm$^3$; and
- wherein the prepolymer fraction is an ethylene homopolymer present in amount of from greater than 0 wt % to 20 wt % of the base resin.

* * * * *

UNITED STATES PATENT AND TRADEMARK OFFICE
CERTIFICATE OF CORRECTION

PATENT NO. : 8,722,807 B2  Page 1 of 1
APPLICATION NO. : 11/666626
DATED : May 13, 2014
INVENTOR(S) : Bäckman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Twenty-ninth Day of September, 2015

Michelle K. Lee
*Director of the United States Patent and Trademark Office*